Dec. 18, 1934.  R. M. STEIN  1,984,817
PARKING LIGHT
Filed Nov. 21, 1933
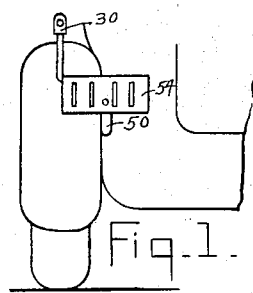
Fig. 1.
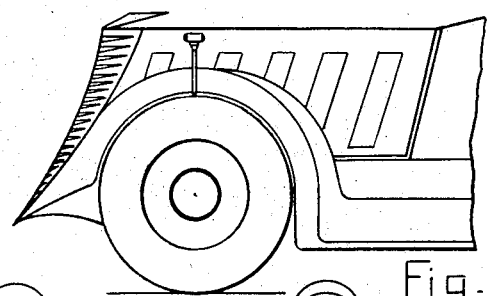
Fig. 2.
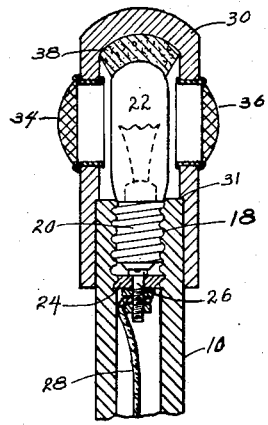
Fig. 3.
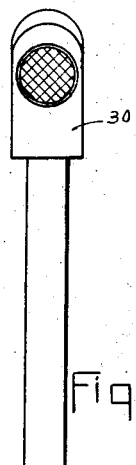
Fig. 4.
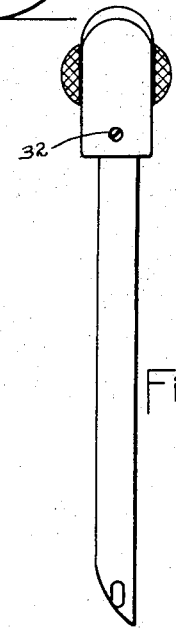
Fig. 5.
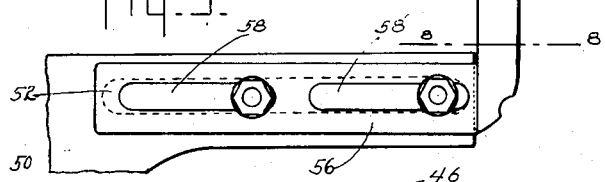
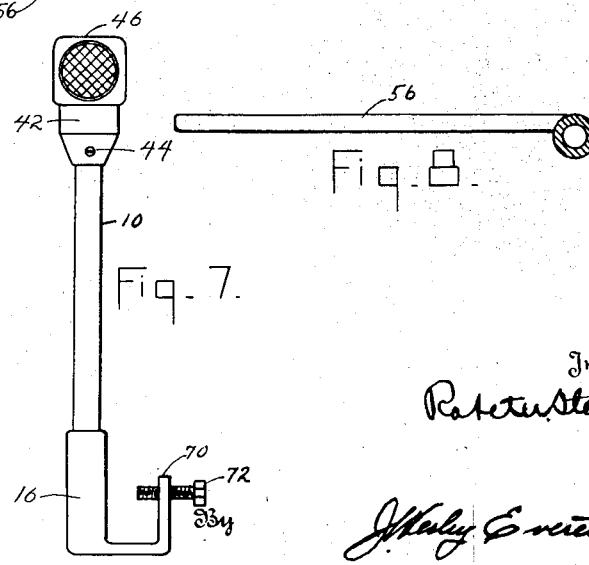
Fig. 6.   Fig. 7.   Fig. 8.
Inventor
Robert Stein
J. Wesley Everett
Attorney Patented Dec. 18, 1934

1,984,817

UNITED STATES PATENT OFFICE 1,984,817

PARKING LIGHT

Robert M. Stein, Baltimore, Md.

Application November 21, 1933, Serial No. 698,949

2 Claims. (Cl. 240—8.22)

The improved parking light comprising the present invention is primarily adapted for use on automobiles, trucks, and other motor vehicles, although the principles of the invention are applicable to other uses and the parking light may be employed on vehicles in general regardless of their nature. In fact the specific construction resorted to in the present application is so designed that it may be applied to other lighting systems whether they be associated with traveling vehicles or whether they be installed and operated from a stationary source. Regardless however of the specific use to which the lighting device is put, the essential features of the invention are at all times preserved.

One object of the present invention is to provide a light that will operate efficiently on very little current.

Another object is to produce a light that may be adjustably mounted upon a vehicle.

Other objects and advantages of the invention, not at this time more particularly enumerated, will become more readily apparent as the nature of the invention is better understood, and the same consists in the novel construction, combination and arrangement of parts shown in the accompanying single sheet of drawings forming a part of this specification and in which:

Figure 1 is a fragmentary rear view of a motor vehicle showing one form of the parking light attached to the license plate bracket thereof.

Figure 2 is a fragmentary side elevation of the vehicle showing another form of the parking light applied to the front fender thereof.

Figure 3 is a fragmentary sectional view taken longitudinally through the upper portion of the parking light assembly, the lamp contained therein being shown in side elevation for convenience.

Figure 4 is a rear elevation of the parking light assembly designed for adjustable attachment to the license plate brackets of a vehicle.

Figure 5 is a side view of the device shown in Figure 4.

Figure 6 is a rear elevation, similar to Figure 4, showing the parking light designed for attachment to a fender of a vehicle.

Figure 7 is a side view of the showing in the preceding figure, and, Figure 8 is a sectional view taken substantially along the line 8—8, Figure 4.

In all the above described views, like characters of references are employed to designate like parts throughout.

In both forms of the invention, the parking light assembly proper comprises in its general organization a tubular member 10, designed for attachment to the motor vehicle in a manner to be substantially described and as shown either in Figure 1 or Figure 2. The tubular member is provided at its upper end with a light assembly and at its lower end with means for securing the light to the license plate bracket as shown in Figure 4, or with the clamping device 16, shown in Figure 6. The tubular member 10 is of sufficient length that when applied to the vehicle in either of the manners shown, the lamp assembly will project upwardly above the top of the fenders of the vehicle so as to be visible from the front and from the rear thereof.

In order to accommodate the lamp, the upper end of the tubular member 10 is interiorly threaded as at 18 to receive therein the threaded base 20 of the lamp element 22. While this lamp element may be of any suitable size and of any suitable capacity, it is preferable that the same be small and of very low capacity. Toward this end the invention contemplates the use of a standard radio pilot light of no more than 15 milliamperes. This lamp is of the single contact type and in order to supply current thereto, a small disc, formed of bakelite or other suitable nonconducting material is threadedly receivable in the threaded portion 18 of the tubular member 10.

A contact element 26 in the form of a threaded bolt extends centrally through the disc 24 and has anchored thereto a lead wire 28 which serves to conduct current to the lamp 22. This wire 28 is insulated and passes centrally through the tubular member 10 and is thereby protected from moisture thus eliminating the possibility of electrical shortage. In this manner all the electrical connections employed are concealed and adequately protected.

The upper end of the tubular member 10 is provided with a cap 30 in the form of a thimble which is telescopically received over the end of this member. The cap 30 is provided with an internal annular shoulder 31 adapted to seat on the upper end of the member 10 to properly position the same thereon. The cap 30 completely encloses the lamp 22 when in position and protects the same from adverse weather conditions. The cap 30 may be anchored to the tubular member 10 by means of set screw 32 which passes through this cap and engages the metal of the tubular member. The forward side of the cap 30 is provided with an opening in which there is disposed an insert of plain or colored glass providing a window 34 which is clearly visible from the front of the vehicle when the assembly is properly installed either as shown in Figure 1 or Figure 2. Similarly the rear side of the cap 30 is provided with a window 36 formed of colored glass, preferably red, that is clearly visible from the rear of the vehicle. These windows 34 and 36 are disposed directly adjacent the 15 milliampere lamp 22. In this manner the maximum lighting effect obtainable is provided through these windows.

In order to retain the lamp 22 securely in the socket provided by the threaded portion 18 of the tubular member 10, a resilient member 38 is interposed between the roof of the cap 30 and the upper extremity of the lamp 22. While this resilient member 38 may be formed in any suitable manner and of any suitable material, the same is shown in this application as being formed of sponge rubber on account of the extreme resiliency of the same and additionally on account of the low cost of this material. If desirable however a suitable coil spring or the like may be substituted for this sponge rubber element. Irrespective however of the specific embodiment of the resilient member 38, the essential features of the invention are not destroyed. In installing the lamp assembly, the lamp 22 is first positioned in the socket 18 provided for the same and the cap 30 is subsequently telescoped into position over the end of the tubular member 10. Pressure is applied downwardly on the lamp 22 and the resilient member 38 is compressed to the desired degree. While this pressure is maintained the set screw 32 is tightened, thus providing a structure in which the lamp 22 is held at all times against dislodgement and in which a good electrical connection is assured.

By virtue of the fact that the invention employs a 15 milliampere lamp having comparatively small dimensions, the size of the thimble or cap 30 may be reduced to a minimum, thus providing a structure which is attractive in its appearance and which at the same time will protect the battery against heavy electrical drain as previously outlined.

In Figures 6 and 7 a slightly modified form of illuminating cap is provided. In this form of the invention a tubular shank 42 is telescopically received over the upper end of the tubular member 10 and is secured permanently thereto by means of a set screw 44, similar to the set screw 32 in the other form of the invention. A tubular rectangular box like structure 46 is formed on the upper end of the shank 42 and is provided with a front window 48, and a rear window 49, and a side window 51. In this form of the invention the resilient member 38 does not appear in the drawing.

In the form of the invention shown in Figures 1, 4, and 5 means is provided for attaching the parking light assembly to the usual license plate bracket 50. The bracket 50 is conventional in its design and is provided with horizontally extended slots 52 for attachment thereto of a license plate 54. The lower end of the tubular member 10 is flattened and bent laterally to provide an attachment arm 56. The arm 56 is provided with slots 58 in register with the slots 52 in the bracket 50 and any suitable securing means such as bolts are passed through the registering slots 52 and 58 in order that the parking light assembly may be properly secured in position on the vehicle. Thus the improved parking light is longitudinally adjustable along the license plate bracket, this provides a means by which the light may be attached to the vehicle in proper position, as the license brackets will vary in position on the various makes of cars.

In the form of the invention shown in Figures 2, 6, and 7 the clamping standard 16 is telescopically received on the lower end of the tubular member 10 and is secured thereon by means of a set screw 68. This standard is of conventional design and comprises an offset arm 70 having a clamping bolt 72 extending therethrough designed to bear against the inner side of the fender of the vehicle to hold the assembly in position. By virtue of the telescope arrangement above described, the height of the parking light proper may be varied to accommodate different types of vehicles.

The invention is not to be limited to the exact arrangement of parts shown in the accompanying drawing or described in this specification as various changes in the details of construction may be resorted to without departing from the spirit of the invention. Only in so far as the invention has particularly been pointed out in the accompanying claims is the same to be limited.

I claim:—

1. In a parking light assembly, an upright member, illuminating means at the upper end of said member, the lower end of said member being bent laterally and to provide a horizontally extending attachment bracket, there being slots extending through said bracket and designed for registry with slots provided in the conventional license plate bracket of a motor vehicle, said illuminating means consisting of a bulb of low amperage threadedly receivable within the upper end of the said upright member, a housing member for housing said bulb, a resilient member interposed between said bulb and housing member, openings adjacent the bulb positioned in forwardly and rearwardly directions and lenses covering said openings.

2. In a parking light for vehicles having a license plate bracket, an upright tubular member providing a conduit for a lead wire, the end being internally threaded to receive a lamp element, a disk of insulated material receivable within the threaded end, a contact element inserted through the center of the said insulated disk and having anchored thereto one end of the said lead wire, the contact element and lead wire serving to conduct current to said lamp, a bulb of low amperage having a threaded shank threadedly receivable in said upper threaded portion of the tubular member, a thimble telescopically received over the upper end of said tubular member, and serving to completely enclose said lamp, means for securing said thimble in position on said tubular member, a yieldable element interposed between said lamp and the upper portion of said thimble and contained therein and serving to maintain said lamp in position in said socket against dislodgment, said thimble being provided with front and rear windows adjacent said lamp for permitting the issue of light rays therefrom forwardly and rearwardly of the vehicle, means for attaching said upright tubular member to the license plate bracket of the said vehicle and means for laterally adjusting said tubular member on the said license plate bracket.

ROBERT M. STEIN.